(12) United States Patent
Pickel et al.

(10) Patent No.: US 8,972,346 B2
(45) Date of Patent: Mar. 3, 2015

(54) METHOD AND SYSTEM FOR MINIMIZING SYNCHRONIZATION EFFORTS OF PARALLEL DATABASE SYSTEMS

(75) Inventors: James W Pickel, San Jose, CA (US); Wolfgang Reichert, Boeblingen (DE); Johannes Schuetzner, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 12/957,530

(22) Filed: Dec. 1, 2010

(65) Prior Publication Data

US 2011/0295800 A1 Dec. 1, 2011

(30) Foreign Application Priority Data

Dec. 11, 2009 (EP) .................................... 09178821

(51) Int. Cl.
*G06F 17/30* (2006.01)
*G06F 7/00* (2006.01)

(52) U.S. Cl.
CPC .............................. *G06F 17/30575* (2013.01)
USPC .......................................... 707/622; 707/633

(58) Field of Classification Search
CPC ..................... G06F 17/30292; G06F 17/30557
USPC .................................................. 707/622, 633
See application file for complete search history.

(56) References Cited

U.S. PATENT DOCUMENTS

| | | | |
|---|---|---|---|
| 7,051,065 B2 | 5/2006 | Pedone | |
| 2004/0221045 A1* | 11/2004 | Joosten et al. | 709/227 |
| 2005/0131879 A1* | 6/2005 | Ghosh et al. | 707/3 |
| 2005/0131893 A1* | 6/2005 | Von Glan | 707/5 |
| 2005/0182782 A1* | 8/2005 | Anderson | 707/102 |
| 2005/0187977 A1* | 8/2005 | Frost | 707/104.1 |
| 2005/0192989 A1* | 9/2005 | Adiba et al. | 707/101 |
| 2006/0015505 A1* | 1/2006 | Henseler et al. | 707/10 |
| 2006/0245367 A1* | 11/2006 | Jeffery et al. | 370/248 |
| 2007/0005603 A1* | 1/2007 | Jain et al. | 707/10 |
| 2008/0046400 A1 | 2/2008 | Shi et al. | |
| 2009/0199210 A1* | 8/2009 | Smith, Jr. | 719/315 |

* cited by examiner

*Primary Examiner* — Pavan Mamillapalli
(74) *Attorney, Agent, or Firm* — Cantor Colburn LLP; William A. Kinnaman, Jr.

(57) ABSTRACT

Operating a parallel database server system, where the database server system comprises at least two database servers and one data source. A client identifier is received from a client requesting services from one of said database servers. Information associated with said client is retrieved. The client is allocated to one of said database servers based on the retrieved information.

20 Claims, 3 Drawing Sheets

METHOD AND SYSTEM FOR MINIMIZING SYNCHRONIZATION EFFORTS OF PARALLEL DATABASE SYSTEMS

CROSS REFERENCE TO RELATED APPLICATIONS

This application claims priority under 35 U.S.C. §119 from European Patent Application No. 09178821.6 filed Dec. 11, 2009, the entire contents of which are incorporated herein by reference

BACKGROUND

The present invention relates to a method and system for minimizing synchronization efforts of parallel database systems.

Parallel database systems need to internally synchronize the read and write accesses from different database servers to the same data to ensure that they always work on the same data. The clients are expecting the parallel database system to provide a single truth of the data as if it were a single database server.

One way of achieving this single truth is disclosed in US 20080046400A1 titled "Apparatus and method of optimizing database clustering with zero transaction loss", incorporated herein by reference. The document discloses a database cluster system that uses multiple stand-alone database servers with independent datasets to deliver higher processing speed and higher service availability at the same time with zero transaction losses. The independent data sets are used to mimic a single database server. This requires constant synchronization. The synchronization of the database servers requires additional processing resources.

Other parallel database systems are made up of a number of database servers each having access to the same data source. In these parallel database systems every piece of data, such as a table, exists exactly once and is stored on the data source. Clients are able to access the data on the data source via one of the database servers. The servers use the data source to read, store and overwrite information necessary for their operation. Problems do occur when two clients try to access the same data on the same data source at the same time. If for example, two clients are updating information in the same table at the same time, then one of those updates could potentially be lost. Another problem may occur when one client reads information via one server and another client updates the same record through another server. The result could be that the client reading the record would not see the latest version of the record.

Therefore, if two or more database servers of a parallel system have access to the same data source, a situation of contention occurs. Efforts have to be taken for the database servers to ensure that they do not destroy the data changes of each other. One way to address the issue is to use a set of rules governing the operation of the servers. For example, one server that is accessing a certain set of data may put that set of data on global lock, which is respected by all database servers. Whilst on global lock, another server cannot have access to said set of data. The other server has to wait for this global lock to be released. Moreover, if one server changed the data and the other server buffered this data in its own buffer pool in memory, it needs to refresh this data to reflect the change. Only then can it access and read the data. This lock method ensures that no data will be lost and that the accessible data is always up to date.

A drawback of measures, such as the lock method, is an inevitable time delay for one server. As the required data is on lock, it is impossible for the server to access the data, resulting in the respective client requiring the data to be on hold. Therefore, the wait time of one database server to access a record that is currently held by another database server would be the result of contention. A further problem is the necessary communication of the different servers concerning the accessibility of the data set.

A further example of implementing a database system with one source is disclosed in the document U.S. Pat. No. 7,051,065 B2, titled "Method and system for performing fault-tolerant online validation of service requests", incorporated herein by reference. Disclosed therein is a method and distributed computing system for validation of service requests. The method includes determining for first and a second processes that requests for service have not been previously validated. This document primarily deals with a solution to the online validation problem, which aims at ensuring that a given service request is processed by a single server entity only.

The drawback of the current state of the art is that the synchronization of the database servers requires too much additional processing resources and can result in increased response times as perceived by the client. The amount of necessary communication between the servers and the data source concerning the accessibility of data is excessive.

BRIEF SUMMARY

It is an object of the present invention to provide a database system and method for operating a database system, which reduce the overhead of processing SQL statements in parallel database systems.

This object is achieved by the independent claims. Advantageous embodiments are detailed in the dependent claims.

The present invention is directed to a method for operating a parallel database server system. The parallel database server system comprises at least two database servers and one data source. The method comprises the step of receiving a client identifier from a client, wherein the client is requesting services from one of the database servers. The method further comprises the step of retrieving information associated with the client. The retrieved information is then used to allocate the client to one of said database servers. This information may be derived by the parallel database system by monitoring the global lock contention on data sets and by monitoring the identifiers of the client transactions that access the data sets.

Firstly, the advantage of this set up with one data source is that there is no need to synchronize different data sources with each other. A further advantage of this method is that it automatically exploits database client identifiers to minimize the synchronization effort of the system. It can provide information about the client at the granularity of transactions. The information can be used by the parallel database system to assign a specific server to process a certain transaction. This enables an automatic derivation of an affinity of transactions to certain database servers. The advantage of such an affinity of transaction is that the grouping of same transactions to certain servers allow for a minimization of inter-server traffic. Less exchange of information is needed between servers concerning transactions from each server to one specific data set. This reduces the overhead of the system. The parallel database system ensures that these transactions are processed at a certain database server only. This minimizes the synchronization efforts as well as the processing overhead as these transactions typically access the same tables. Grouping the client transactions to a certain table at one database server has the further advantage that the server usually does not have to compete for global locks on this table with other servers, since the dedicated server primarily services accesses to said table.

A further preferred embodiment of the invention comprises the step generating the retrieved information about the clients by monitoring the transactions of the clients.

Monitoring the transactions workload of clients gives an indication as to which client transactions cause the largest amount of global lock contention. This allows for a regrouping of the client connections to different servers based on the amount and kind of traffic they generate, at the granularity of transactions.

A further preferred embodiment of the invention comprises generating the information about the client transactions by determining data sets of the data source which are being accessed by the client.

Determining the respective data set, which the client transactions access, allows for a closer analysis of possible contentions. Once client transactions have been determined that solely or primarily access the same data set, then these clients can be grouped to one specific database server. This dedicated database server is cognizant of the state of the specific data set, because it primarily services requests to this data set.

A further preferred embodiment of the invention comprises only generated information for a specific client transaction if the level of accesses to a specific data set surpasses a predetermined threshold over a predetermined time interval.

This measure ensures that the information about the client transactions is only updated when a certain amount of contention is to be expected. This embodiment ensures that the overhead of constantly monitoring all data sets that are being accessed is reduced. Now only the data set with heavy access are being monitored.

A further preferred embodiment of the invention comprises updating the client information after each client transaction is terminated.

Constantly updating the client information after each terminated transaction allows for very accurate client information. It ensures for that the client information used for the next transaction of the same client is always up to date.

A further preferred embodiment of the invention comprises only updating the client information after a predetermined number of terminated client transactions. Updating the client information after every termination may again increase the overhead. Therefore only updating the information after a certain number of terminations is an optimal way of balancing the extra overhead with the advantages of up-to-date information.

A further preferred embodiment of the invention comprises generating information by evaluating possible upcoming transactions. By evaluation upcoming transactions, the database servers are prepared for possible increases in contention. For example, if a client transaction is transferred to a different server, while other clients of the same group remain, then this is a source of further contention. To minimize the impact of the first client switching servers, the whole group of clients may be transferred to a different server at the same time.

BRIEF DESCRIPTION OF THE SEVERAL VIEWS OF THE DRAWINGS

Preferred embodiments of the invention are illustrated in the accompanied figures. These embodiments are merely exemplary, i.e. they are not intended to limit the content and scope of the appended claims.

DETAILED DESCRIPTION

Figure 1:
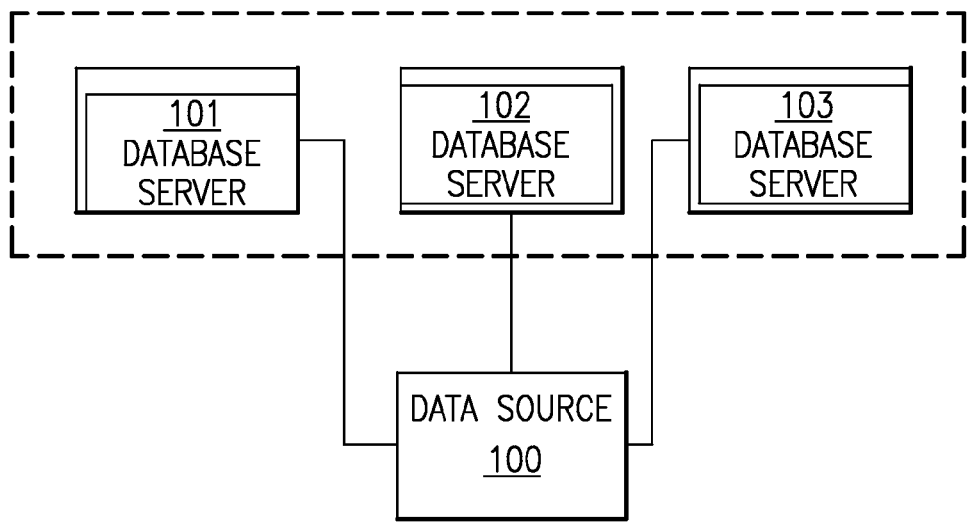
FIG. 1 illustrates a state of the art parallel database system with one data source.

Referring now to FIG. 1, a simplified set-up of a parallel database system is shown. The database servers 101, 102, 103 are all connected to one data source 100. Clients seeking access to data in the data source do so via one of the database servers 101, 102 or 103.

Figure 2:
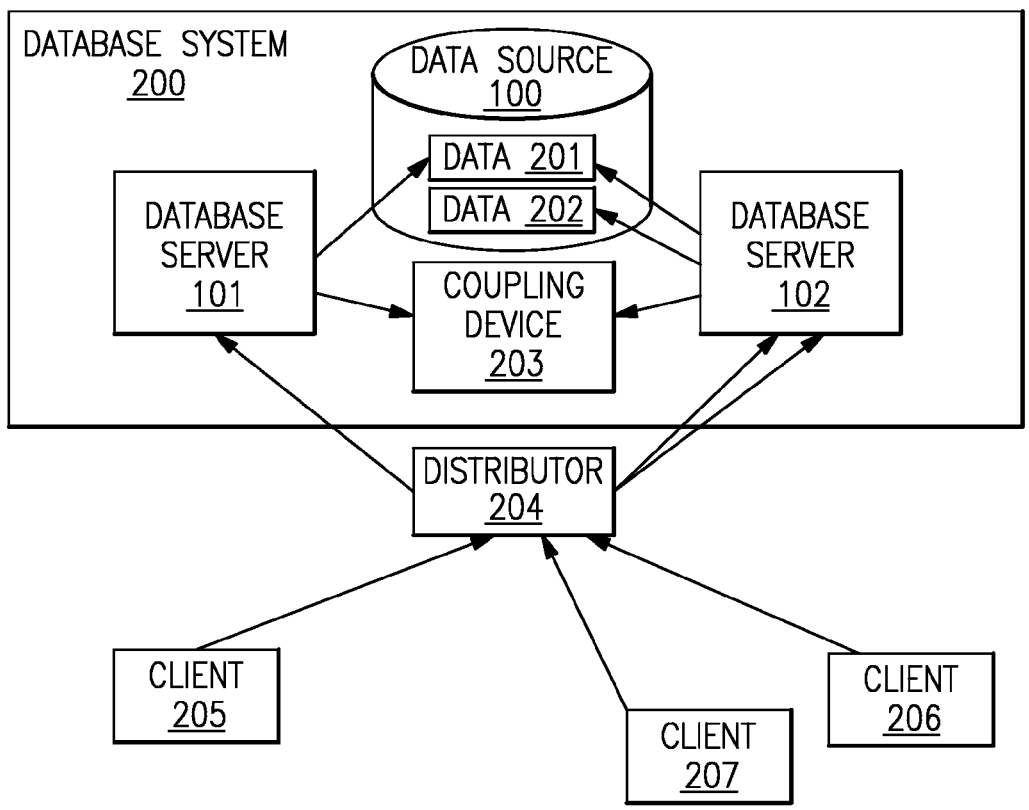
FIG. 2 illustrates a further state of the art database system having plural data source.

FIG. 2 illustrates a state of the art parallel database system 200. The system comprises two database servers 101 and 102. Both database servers 101 and 102 are connected to a data source 100. Also illustrated are clients 205, 206 and 207. Clients 205, 206 and 207 seek access to the data source 100. Clients 205, 206 and 207 need to identify themselves with the distributor 204 in order to get access to the data source 100. The distributor 204 allocates clients 205, 206 and 207 to the different database servers based on the current utilization of the database servers. The distributor 204 may also be part of the database servers and may propagate information about the utilization of the database servers to the clients. In this example, database 101 is allocated to client 205 and database 102 is allocated to clients 206 and 207. The clients 205, 206 and 207 identify themselves to the respective database servers 101 and 102. The coupling device 203 determines the data of the data source to which the clients 205, 206 and 207 are seeking access to. In this case a contention occurs because one client is seeking access to data 201 through the database server 101 while another client is also seeking access to the data 201 through database server 102. Both servers cannot have access to the same data concurrently. So while the first server is granted access, the other server is put on hold. The basis for this determination is the relative prioritizations of the contending client.

Figure 3:
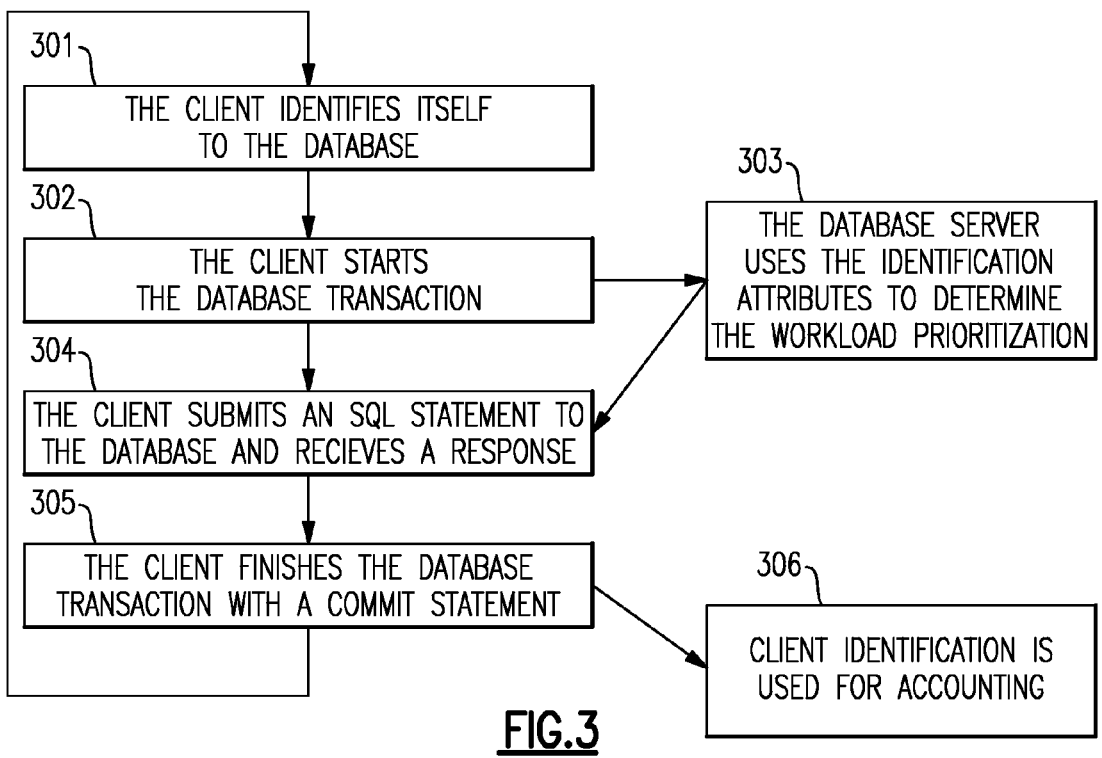
FIG. 3 illustrates a state of the art method for operating a database system.

FIG. 3 illustrates a flow chart depicting the method of the state of the art. In step 301 the client 205, 206, 207 identifies itself to the database. This is performed by transferring a list of identification attributes to the database server 101, 102. These attributes include the product name, the client or component name, the transaction type (online, batch, analytical query, etc.), transaction name, end user name, etc. In step 302 the client 205, 206, 207 starts the database transaction. In step 303, the database server uses the identification attributes to determine the workload prioritization. The priority is set by the workload management of the operating system according to workload policies. The priority is often determined by the transaction type. For example, a transaction type "online" has a higher importance than a transaction type "batch". Thereafter, the client 205, 206, 207 submits an SQL statement to the database and receives a response in step 304. In step 305, the client 205, 206, 207 finishes the database transaction with a COMMIT statement. Upon completion of the transaction, the client identification is used for accounting in step 306. This accounting comprises the database collecting usage statistics for every transaction. Additionally, transactions with the same identification are grouped. The accounting information also includes the list of data sets 201, 202 that have been accessed.

Figure 4:
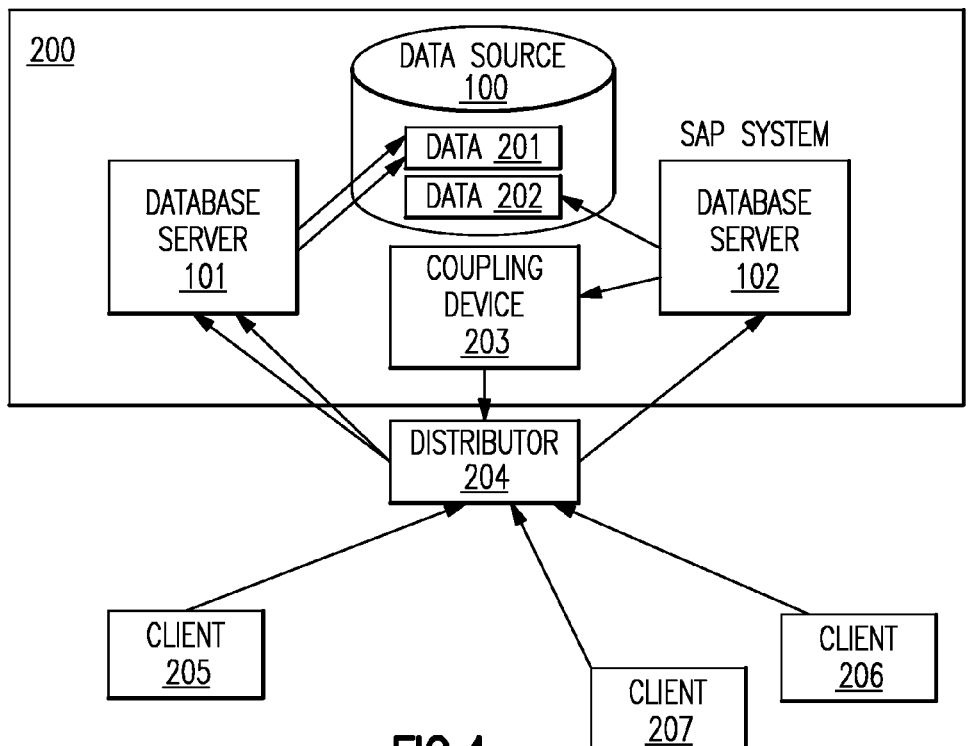
FIG. 4 illustrates a preferred embodiment of the system for operating a database system according to the present invention.

FIG. 4 illustrates a preferred embodiment of the method of an exemplary parallel database system 200 according to the present invention. The system comprises two database servers 101 and 102. Both database servers 101 and 102 are connected to a data source 100. Clients 205, 206 and 207 seek access to the data source 100. In order to get access to the data source 100, clients 205, 206 and 207 need to identify themselves with the distributor 204. The distributor 204 allocates the clients 205, 206 and 207 to the different database servers 101 and 102. In addition, a coupling device 203 and a distributor 204 are provided in FIG. 4. In this embodiment, the coupling device 203 influences the decision of the distributor 204. The coupling device 203 effectively determines which database servers 101 or 102 are allocated to which client 205, 206 or 207. The decision is influenced by recommendations stored in a client database, which the coupling device has derived earlier by monitoring the global lock contention on data sets and by monitoring the identifiers of the client transactions that access the data sets. In this example, the same clients 205, 206 and 207 are seeking access as in FIG. 2. After checking the recommendations concerning the clients 205 and 206 in the client table, the coupling device 203 determines that a contention exists between clients 205 and 206. Both clients seek to access the same data 201. After checking the client database, the coupling device 203 recommends both clients 205 and 206 to be allocated to the same database server 101. The allocation of the two contenting clients 205 and 206 to the same database server minimizes synchronization efforts (a.k.a. global contention) and processing overhead as these clients 205 and 206 typically access the same data.

Figure 5:
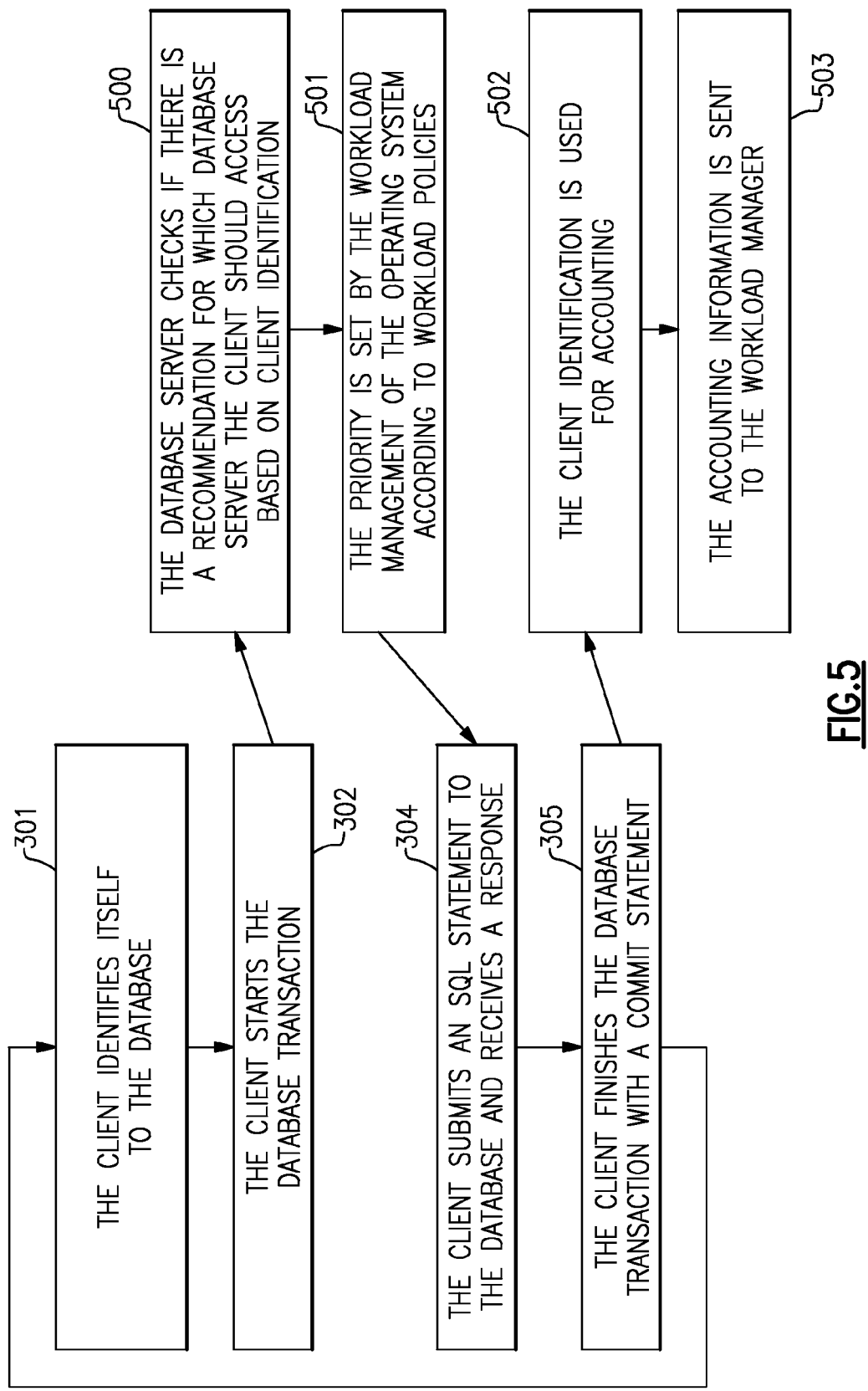
FIG. 5 illustrates a preferred embodiment of the method for operating a database system according to the present invention.

FIG. 5 illustrates in a flow chart a preferred embodiment of the invention. In step 301 the client identifies itself to the database server system. This is done by transferring a list of identification attributes to the system. These attributes may include the product name, the client or component name, the transaction type (online, batch, analytical query, etc.), transaction name, user name, etc. In step 302 the client starts the database transaction. In step 500, the database server 101, 102 checks if there is a recommendation for which database server 101, 102 the client 205, 206, 207 should access based on client identification. This is done by checking the client identification against existing recommendations which have been created by the workload manager based on previous transactions. If a different server 101, 102 is recommended, then the client 205, 206, 207 is redirected to that database server 101, 102.

In step 501 of FIG. 5 the priority is set by the workload management 203 of the operating system according to workload policies. The workload management is part of the coupling device 203. The priority is generally determined by the transaction type. For example a transaction type "online" has a higher importance then a transaction tape "batch". Once allowed access, the client 205, 206, 207 submits SQL statement to the database 101, 102 and receives response in step 304. In step 305 the client 205, 206, 207 finishes the database transaction with a COMMIT statement. Upon completion of the transaction, the client identification is used for accounting in step 502. This accounting comprises the database collecting usage statistics for every transaction. Additionally, transactions with the same identification are grouped. The accounting information also includes the list of database objects that have been accessed. If there was significant contention due to parallel database server access, then this accounting record is marked for further investigation by the workload manager. The accounting information is sent to the workload manager 503.

The coupling device 203 analyses whether relevant information is retrieved from the database accounting records. For practical reason, the coupling device 203 analyses the topmost contentions in the last n seconds. In particular, the coupling device 203 analyses, which data sets 201, 202 have been accessed in parallel causing contention. The coupling device 203 also analyses which transactions were causing the contention. Based on this information, the coupling device 203 generates recommendations for the client. Finally, the coupling device evaluates recommendations based on upcoming transaction. For example, the workload manager evaluates what impact upcoming transaction may have on contention. Based on this evaluation, the workload manager may decide, that a whole group of transactions should be reassigned to another server. Another constraint which the coupling device has to account for is the processing power of the server. Therefore, recommendations have to take into account how many transactions already run on the servers.

As a result of this preferred embodiment, the necessary communication between the servers regarding the accessibility of data sets is minimized. If one server has sole access to a certain data set, then that server is aware if that data set is in use or not. No more communication is needed with other servers. Therefore the traffic is minimized. Communication between servers will only become necessary when contention occurs between different servers.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A method for operating a parallel database server system, said database server system comprising at least two database servers and one data source, said method comprising:
   receiving a client identifier from a first client requesting first services from said database servers, wherein the first services require access to a first data set in the data source, and wherein the first data set of data source is accessible to each of said database servers;
   retrieving information associated with said first client;
   selecting a first database server of said at least two database servers based at least in part on the retrieved information and on the first data set required for the first services;
   receiving a client identifier from a second client requesting second services from said database servers, wherein the second services require access to the first data set in the data source; and
   allocating both the first client and the second client to the first database server of said database servers, based at least in part on the first services requested by the first client and the second services requested by the second client both requiring access to the first data set, wherein the first database is configured to manage contentions between the first client and the second client on the first data set of the data source.

2. The method according to claim 1, wherein said retrieved information comprises recommendations about the allocation of the first client to the database servers.

3. The method according to claim 1, wherein said retrieving information comprises:
   monitoring transactions of said first client; and
   generating the associated information based on the monitored transactions.

4. The method according to claim 3, wherein said generating information comprises determining one or more data sets of the data source, said one or more data sets being accessed by the first client.

5. The method according to claim 4, wherein the information is generated only if the level of accesses to the first data set surpasses a predetermined threshold over a predetermined time interval.

6. The method according to one of the claim 3, wherein said generating the associated information comprises:
   monitoring global lock contention on one or more data sets of the data source;
   monitoring the client identifiers of the client transactions that access the one or more data sets; and
   generating information about global lock contention on the one or more data sets accessed by the monitored transactions.

7. A parallel database server system, said database server system comprising at least two database servers and one data source wherein the parallel database server system further comprises:

a memory;
a processor in communication with said memory; and
a distributor configured to:
    receive a client identifier from a first client requesting first services from said database servers, wherein the first services require access to a first data set in the data source, and wherein the first data set of data source is accessible to each of said database servers;
    retrieve information associated with said first client;
    select a first database server of said at least two database servers based at least in part on the retrieved information and on the first data set required for the first services;
    receive a client identifier from a second client requesting second services from said database servers, wherein the second services require access to the first data set in the data source; and
    allocate both the first client and the second client to the first database server of said database servers, based at least in part on the first services requested by the first client and the second services requested by the second client both requiring access to the first data set, wherein the first database is configured to manage contentions between the first client and the second client on the first data set of the data source.

8. The parallel database server system according to claim 7, wherein the distributor is further configured to retrieve information comprising recommendations about the allocation of the first client to database servers.

9. The parallel database server system according to claim 7, wherein the distributor is configured to retrieve information by performing:
    monitoring transactions of said first client, and
    generating the associated information based on the monitored transactions.

10. The parallel database server system according to claim 9, wherein the distributor is further configured to generate information by determining one or more data sets of the data source, said one or more data sets being accessed by the first client.

11. The parallel database server system according to claim 10, wherein the distributor is configured to generate information only if the level of accesses to the first data set surpasses a predetermined threshold over a predetermined time interval.

12. The parallel database server system according to claim 9, wherein the distributor is configured to update the recommendations after a predetermined number of terminated client transactions.

13. The parallel database server system according to claim 7, wherein the distributor is configured to evaluate upcoming transactions for generating information.

14. The parallel database server system according to claim 7, wherein the distributor is configured to retrieve information by generating information; and
wherein the distributor is further configured to allocate two or more clients based on that information.

15. A computer program product comprising a non-transitory computer usable medium including computer usable program code, wherein the computer usable program code is configured to execute a method comprising:
    receiving a client identifier from a first client requesting first services from said database servers, wherein the first services require access to a first data set in the data source, and wherein the first data set of data source is accessible to each of said database servers;
    retrieving information associated with said first client;
    selecting a first database server of said at least two database servers based at least in part on the retrieved information and on the first data set required for the first services;
    receiving a client identifier from a second client requesting second services from said database servers, wherein the second services require access to the first data set in the data source; and
    allocating both the first client and the second client to the first database server of said database servers, based at least in part on the first services requested by the first client and the second services requested by the second client both requiring access to the first data set, wherein the first database is configured to manage contentions between the first client and the second client on the first data set of the data source.

16. The computer program product according to claim 15, wherein said retrieved information comprises recommendations about the allocation of the first client to the database servers.

17. The computer program product according to claim 15, wherein said retrieving information comprises:
    monitoring transactions of said first client; and
    generating the associated information based on the monitored transactions.

18. The computer program product according to claim 17, wherein said generating information comprises determining one or more data sets of the data source, said one or more data sets being accessed by the first client.

19. The computer program product according to claim 18, wherein the information is generated only if the level of accesses to the first data set surpasses a predetermined threshold over a predetermined time interval.

20. The computer program product according to one of the claim 17, wherein said generating the associated information comprises:
    monitoring global lock contention on one or more data sets of the data source;
    monitoring the client identifiers of the client transactions that access the one or more data sets; and
    generating information about global lock contention on the one or more data sets accessed by the monitored transactions.

* * * * *